United States Patent
Drabon et al.

(10) Patent No.: US 9,744,823 B2
(45) Date of Patent: Aug. 29, 2017

(54) MOTOR VEHICLE REAR AXLE WITH ELASTIC MOUNTING

(71) Applicant: BENTELER AUTOMOBILTECHNIK GMBH, Paderborn (DE)

(72) Inventors: Rodscha Drabon, Salzkotten (DE); Peter Koczar, Wiesbaden (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 164 days.

(21) Appl. No.: 14/853,321

(22) Filed: Sep. 14, 2015

(65) Prior Publication Data
US 2016/0075378 A1 Mar. 17, 2016

(30) Foreign Application Priority Data
Sep. 15, 2014 (DE) .......... 10 2014 113 261

(51) Int. Cl.
*B60G 3/20* (2006.01)

(52) U.S. Cl.
CPC .......... *B60G 3/20* (2013.01); *B60G 2200/144* (2013.01); *B60G 2200/46* (2013.01); *B60G 2200/4622* (2013.01); *B60G 2400/91* (2013.01)

(58) Field of Classification Search
CPC ............. B60G 3/20; B60G 2200/4322; B60G 2400/91; B60G 2200/43; B60G 2200/144
USPC ....................................... 280/55.1
See application file for complete search history.

(56) References Cited

U.S. PATENT DOCUMENTS

| 4,513,990 A * | 4/1985 | Morita ............ B60G 7/02 267/153 |
| 4,621,830 A * | 11/1986 | Kanai ............ B60G 3/202 267/274 |
| 4,729,578 A | 3/1988 | Kondo et al. |
| 4,989,894 A * | 2/1991 | Winsor ............ B60G 3/22 280/124.109 |
| 2010/0019465 A1* | 1/2010 | Yuta ............ B60G 3/20 280/86.758 |
| 2010/0032921 A1* | 2/2010 | Nishigaya ........ B60G 3/10 280/124.176 |

(Continued)

FOREIGN PATENT DOCUMENTS

| DE | 3713787 C2 | 2/1992 |
| DE | 10005472 A1 | 8/2001 |

(Continued)

*Primary Examiner* — Karen Beck
(74) *Attorney, Agent, or Firm* — Hauptman Ham, LLP

(57) ABSTRACT

A rear axle arrangement for a motor vehicle is disclosed having two independent wheel suspension systems with in each case at least two links and a wheel support. The links producing a connection between the vehicle body and the wheel support and being coupled at their ends in a relatively movable manner via elastic bearings. In the case of static wheel loading, the wheels of the rear axle exhibiting toe-in, which rear axle arrangement is distinguished by at least one elastic bearing of a link having a frequency-dependent bearing stiffness in such a way that, in the case of driving straight ahead and high-frequency dynamic wheel loading, a change into toe-out takes place on account of an increasing bearing stiffness of the bearing and the wheel is pressed into negative camber as a result of the change into toe-out.

8 Claims, 3 Drawing Sheets

(56) References Cited

U.S. PATENT DOCUMENTS

Figures 3A, 3B:
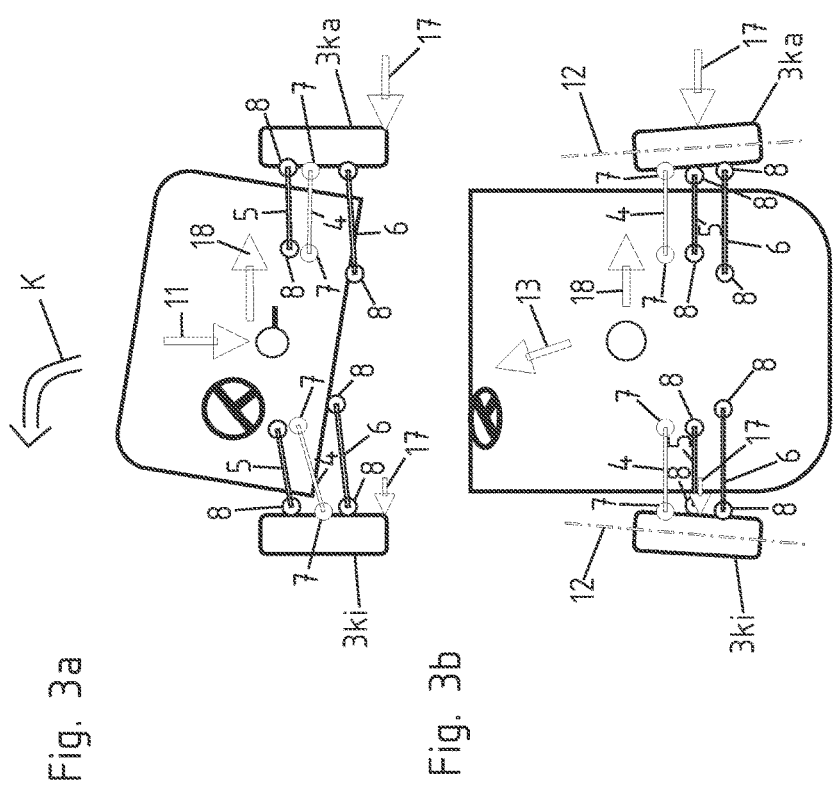

| | | | |
|---|---|---|---|
| 2010/0066040 A1* | 3/2010 | Suyama | B62D 5/0418 |
| | | | 280/5.522 |
| 2010/0164189 A1* | 7/2010 | Buma | B60G 17/0161 |
| | | | 280/5.521 |
| 2010/0201086 A1* | 8/2010 | Sagara | B60G 3/20 |
| | | | 280/5.522 |
| 2012/0013095 A1* | 1/2012 | Gerrard | B60G 3/26 |
| | | | 280/124.134 |
| 2013/0127130 A1 | 5/2013 | Schulz et al. | |
| 2015/0014956 A1* | 1/2015 | Roland | B60G 21/051 |
| | | | 280/124.128 |
| 2015/0061251 A1* | 3/2015 | Yamada | B60G 3/26 |
| | | | 280/86.757 |
| 2016/0075378 A1* | 3/2016 | Drabon | B60G 3/20 |
| | | | 280/5.521 |

FOREIGN PATENT DOCUMENTS

| | | |
|---|---|---|
| DE | 10207654 A1 | 9/2003 |
| DE | 19721754 B4 | 3/2004 |
| DE | 102011055572 A1 | 5/2013 |
| DE | 102012221699 A1 | 7/2013 |
| EP | 1123821 A2 | 8/2001 |
| WO | 2008122857 A1 | 10/2008 |

* cited by examiner

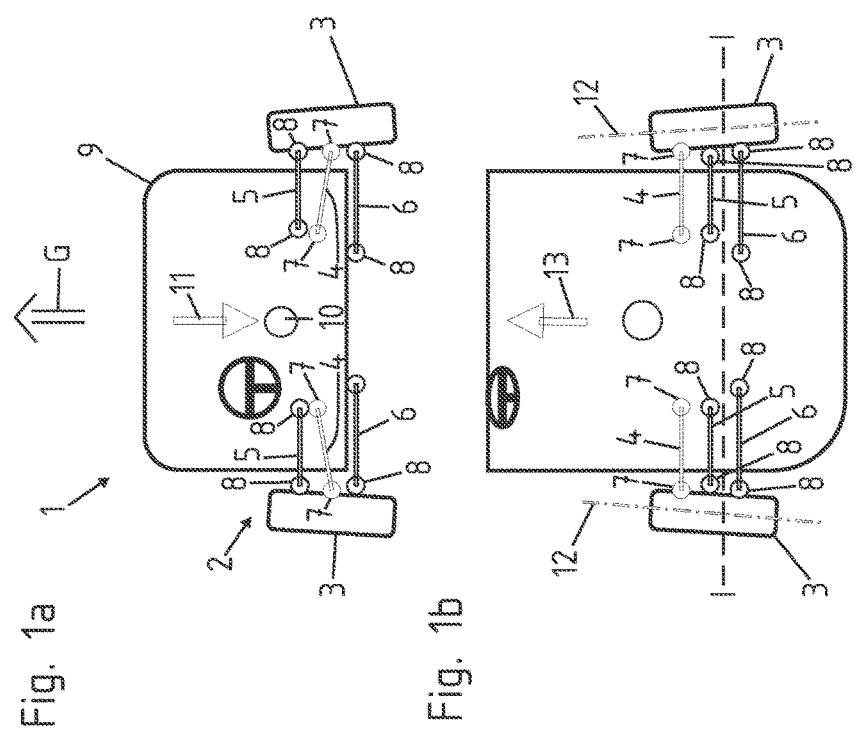

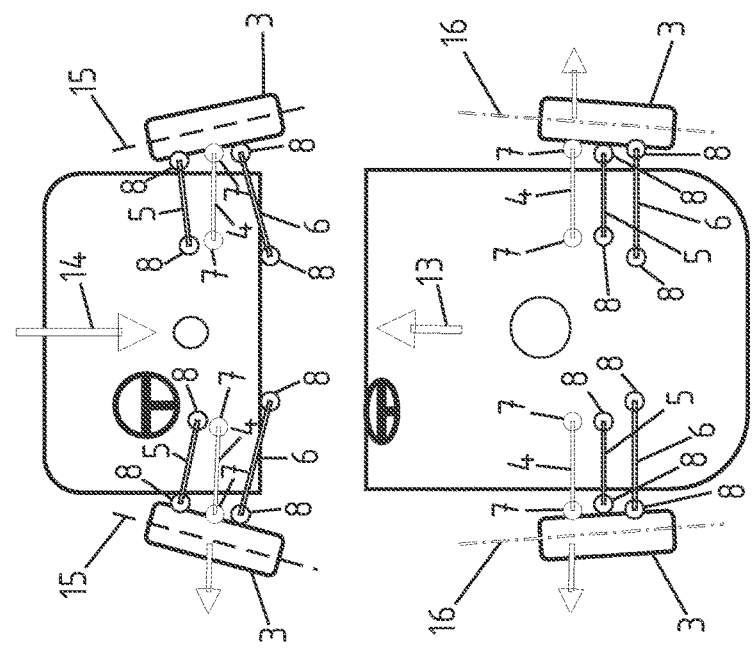

MOTOR VEHICLE REAR AXLE WITH ELASTIC MOUNTING

RELATED APPLICATIONS

The present application claims priority from German Application Number 10 2014 113 261.0, filed Sep. 15, 2014, the disclosure of which is hereby incorporated by reference herein in its entirety.

The present invention relates to a rear axle arrangement of a motor vehicle in accordance with the features in the preamble of patent claim 1.

In motor vehicles, two axles are as a rule used on one motor vehicle. These are firstly the steered front axle and secondly the non-steered rear axle. Here, the wheels of each axle have a setting in terms of toe and camber which change during the driving state on account of the kinematic coupling of the wheel to an axle subframe or else to the vehicle body.

In order to achieve a stable driving state, in particular when driving around a bend, the aim, in particular in the case of the rear axle, is to achieve an increased lateral steering force, with the result that a critical driving state is avoided in the case of oversteer of the motor vehicle. This is also known as skidding of the rear.

Various systems are known from the prior art in the case of the wheel suspension systems. In particular, independent wheel suspension systems are known, however, in which each wheel is coupled individually in a relatively movable manner to the vehicle body. The connection is brought about either directly at the bearing attachment point on the vehicle body or, as an alternative, at least some of the links are connected to an axle subframe.

Multi-link wheel suspension systems, in particular, afford the possibility, by way of the use of at least three, in particular four or else five individual links, to produce a kinematic coupling of the wheel or the wheel support to the vehicle body such that comprehensive toe and camber settings arise during the driving state on account of the kinematic coupling.

It is known then to additionally influence the driving state by way of various technical measures. For example, rear axles are known to this end which experience auxiliary steering via an actuator adjusting drive in such a way that the toe and/or camber are/is in each case set additionally actively in the desired position of the wheel. A disadvantage of a system of this type, however, is the high associated manufacturing costs on account of the use of an actuator adjusting drive and the increased maintenance and repair costs of a system of this type.

DE 197 21 754 B4 has disclosed a wheel suspension system, in which a toe-in change of the wheel is brought about via an elastic link bearing under the action of lateral forces on the wheel when driving around a bend.

Furthermore, DE 37 13 787 C2 has disclosed a multi-link wheel suspension system, in which an elastic deformation of a bearing leads to a desired wheel steering position depending on the lateral force which is applied.

Proceeding from the prior art, it is an object of the present invention to provide a rear axle suspension system which is improved in respect of agility and tire wear in comparison with known rear axles and at the same time achieves improved driving stability of the motor vehicle at high speeds.

The rear axle arrangement of a motor vehicle has two independent wheel suspension systems with in each case at least two links, in particular three links, preferably four links and particularly preferably five links and a wheel support. The links produce a connection between the vehicle body and the wheel support, the ends of the links being coupled in a relatively movable manner via bearings and, in the case of static wheel loading, the wheels of the rear axle exhibiting toe-in. Each wheel is therefore fastened to a wheel support, and the wheel support is coupled in a relatively movable manner to the vehicle body via links for compression and rebound. The coupling of the links to the vehicle body can take place either directly to the vehicle body and/or to an axle subframe. Rubber/metal bearings are used, in particular, as bearings, but also merely a bearing with one degree of rotational freedom in the simplest form.

It is provided then according to the invention that at least one bearing of a link, preferably the two bearings of one link, therefore the bearing on the wheel support side and the bearing on the vehicle body side, have a frequency-dependent bearing stiffness. The frequency-dependent bearing stiffness is configured in such a way that, in the case of driving straight ahead and high-frequency dynamic wheel loading, the bearing stiffness of the bearing increases and a change into toe-out takes place. The wheel is pressed into negative camber as a result of the change into toe-out.

Furthermore, it is optionally provided according to the invention that, in the case of driving around a bend, an elastic deformation of the bearing at the wheel on the outside of the bend maintains a toe-in of the wheel in the case of low-frequency excitation and/or controls the wheel into toe-in.

The kinematic coupling of the respective wheel suspension system is fundamentally configured in such a way that a corresponding toe and camber setting is dependent on the respective compression and rebound travel of the wheel. The respectively assumed toe and camber setting is increased or reduced by way of the frequency-dependent bearing stiffness. The rear axle suspension system is therefore designed in such a way that the respective wheel controls purely kinematically into toe-out in the case of low-frequency dynamic wheel loading, therefore quasi-static excitation. A toe change of this type takes place, in particular, in a manner which is free from lateral force, with the result that the wheel is set into negative camber via the gyroscopic effects of the rolling wheel as a result of the change into toe-out.

In the case of high-frequency roadway excitation, hardening is then performed by way of the increasing bearing stiffness of the frequency-dependent bearing, with the result that the wheel is always initially additionally pressed in the direction of negative camber as a result of the change into toe-out. As a result, it is to be considered to be an effect that the driving comfort is increased and at the same time the tire wear is reduced, on account of fewer dynamic relative movements in the wheel contact area.

Both the kinematics of the wheel suspension system and the frequency-dependent bearing stiffness are optionally to be designed in such a way that, in the case of driving around a bend with low-frequency excitation, therefore the quasi-static lateral force of the links which occurs on the wheels with the frequency-dependent bearing, the wheel controls in the direction of toe-in or, if toe-in has already been adopted, it is maintained. The toe-in of the rear axle in the case of driving around a bend increases the driving stability, in particular, since oversteer is prevented. This is realized, in particular, by way of an elastic deformation of the at least one bearing with frequency-dependent bearing stiffness. Here, the low-frequency range lies at a frequency of preferably below 2 Hz.

In the particularly preferred design variant, in the case of a multi-link arrangement which is configured, in particular, for a wheel from at least three links, the front link which points in the driving direction is configured with the embodiment according to the invention of at least one bearing with frequency-dependent bearing stiffness. Two bearings are preferably provided which in each case have frequency-dependent bearing stiffness; in particular, the frequency-dependent bearing stiffnesses of both bearings are identical.

The bearing with frequency-dependent bearing stiffness is preferably configured in the form of a hydromount. Here, a hydromount affords the possibility of providing a complex interacting fluid structure system by way of the interaction of elastomeric components and with the incorporation of a hydraulic medium under dynamic operating conditions. Here, indirect effects as a result of a hyper-elastic, non-linear material behavior of the rubber body in conjunction with a flow behavior of the viscous liquid and contact of the rubber body with walls which occurs are to be noted, by way of which the desired properties of the hydromount can be designed in a targeted manner. This takes place within the context of the invention depending on the respective excitation frequency in adaptation to the force which occurs, for example by way of a suitable selection of the viscosity of the hydraulic medium which is used.

Here, the bearing is configured, in particular, in the form of a cylindrical bearing, the center longitudinal axis of which runs such that it is oriented in the vehicle longitudinal direction in a manner which is directed in the main direction, with the result that the wheel steering forces which are introduced by the link are introduced in the radial direction into the bearing, in particular into the hydromount. To this end, the respective links are preferably configured as link rods.

The frequency-dependent bearing is designed, in particular, with a non-linear bearing stiffness in such a way that it has a higher bearing stiffness in the case of higher-frequency excitation in a range of, in particular, above 2 Hz, there being a lower bearing stiffness in comparison, particularly preferably combined with an elastic deformability, in the case of low-frequency excitation, in particular below 2 Hz.

Further advantages, features, properties and aspects of the present invention are the subject matter of the following description. Preferred refinements are shown in the diagrammatic figures which serve for simple understanding of the invention and in which:

FIGS. 1a and 1b show a sectional view in the motor vehicle transverse direction and a sectional view in the motor vehicle vertical direction in the case of static wheel loading, FIGS. 2a and 2b show the views from FIG. 1 when loaded with additionally dynamic wheel loading in the case of driving straight ahead, and FIGS. 3a and 3b show the sectional views from FIG. 1 in the case of driving around a left-hand bend.

The same designations are used for identical or similar components in the figures, even if a repeated description is dispensed with for reasons of simplicity.

FIG. 1 shows, in the case of FIG. 1a, a cross-sectional view through a motor vehicle 1 in a rear view in the motor vehicle longitudinal direction according to the sectional line I-I from FIG. 1b. FIG. 1b shows a sectional view in plan view from the viewing direction of the motor vehicle vertical direction of a rear axle of a motor vehicle 1.

FIG. 1a shows a motor vehicle 1 having a rear axle arrangement 2 with in each case one wheel 3, the wheel 3 being coupled to the motor vehicle body 9 via a plurality of links, in particular three links 4, 5, 6 as shown here. This is an independent wheel suspension system, with the result that the respective wheel 3 of a motor vehicle side is coupled in each case individually to the motor vehicle body 9. A wheel support which is not shown in greater detail is installed on the wheel 3, on which wheel support in turn the ends of the links 4, 5, 6 are coupled by means of bearings 7, 8, the bearings 8 of the links 5 and 6 preferably being commercially available rubber/metal bearings, and the bearings 7 of the link 4 being bearings 7 according to the invention, in particular hydromounts with frequency-dependent bearing stiffness.

If the vehicle centroid 10 is then loaded with the vehicle weight 11, static wheel loading prevails at each wheel 3. Here, the vehicle according to FIG. 1b is set in such a way that toe-in 12 results at the wheels 3, indicated by the center lines which run through the wheels 3 and run toward one another in the direction of the front of the vehicle or driving direction 13.

If, according to FIG. 2a, the vehicle weight 14 is then increased by a corresponding compression force, occurring, for example, as a result of dynamic wheel loading or increasing loading of the motor vehicle 1, negative camber 15 results on account of the kinematic coupling of all the links 4, 5, 6 to the motor vehicle body 9. This effect is increased in the case of a high-frequency roadway excitation, therefore, in particular, at a high speed while driving straight ahead, according to FIG. 2b by way of the first link 4 which is shown in the driving direction 13 and its bearing 7 with frequency-dependent bearing stiffness, with the result that the wheels 3 are pressed outward and are adjusted to a more pronounced extent initially into toe-out 16. As a result of the change into toe-out 16, the wheels 3 according to FIG. 2a are at the same time pressed to a pronounced extent into negative camber 15.

If, according to FIGS. 3a and b, driving around a bend then takes place with a lateral force which occurs in a quasi-static manner, a low-frequency excitation takes place here, with the result that the lateral wheel steering force 17 is introduced radially into the bearings 7, 8 of the links 4, 5, 6. On account of the frequency dependence of the bearing 7 of the link 4, the bearing 7 is deformed to a more pronounced extent, since the bearing stiffness is lower in the case of low-frequency excitation and the bearing 7 can therefore be deformed elastically in a corresponding manner, and in turn, according to FIG. 3b, rotates the wheel on the outside of a bend 3ka into toe-in 12 or maintains the toe-in 12 which already exists. On account of the toe-in 12 in the case of driving around a bend, the wheel 3 can build up a higher lateral steering force, with the result that oversteer is in turn avoided.

In the case of the wheel on the inside of a bend 3ki, the toe-in is set when driving around a bend on account of the kinematic coupling of the wheel to the vehicle body.

LIST OF DESIGNATIONS

1—Motor vehicle
2—Rear axle arrangement
3—Wheel
3ka—Wheel on the outside of a bend
3ki—Wheel on the inside of a bend
4—Link to 7
5—Link
6—Link
7—Bearing to 4
8—Bearing to 5, 6
9—Motor vehicle body
10—Vehicle centroid 11—Vehicle weight
12—Toe-in
13—Driving direction
14—Vehicle weight+Spring deflection
15—Negative camber
16—Toe-out
17—Lateral wheel steering force
18—Centrifugal force
G—Driving straight ahead
K—Driving around a bend

The invention claimed is:

1. A rear axle arrangement of a motor vehicle, having two independent wheel suspension systems with in each case at least two links and a wheel support, the links producing a connection between the vehicle body and the wheel support and being coupled at their ends in a relatively movable manner via bearings and, in the case of static wheel loading, wheels of the rear axle exhibiting toe-in, wherein at least one elastic bearing of a link has a frequency-dependent bearing stiffness in such a way that, in the case of driving straight ahead and high-frequency dynamic wheel loading, a change into toe-out takes place on account of an increasing bearing stiffness of the bearing and the wheel is pressed into negative camber as a result of the change into toe-out.

2. The rear axle arrangement as claimed in claim 1, wherein, in the case of driving around a bend, an elastic deformation of the bearing maintains a toe-in of the wheel on the outside of the bend in the case of low-frequency excitation and/or controls the wheel on the outside of the bend into toe in.

3. The rear axle arrangement as claimed in claim 1, wherein the elastic bearing is a hydromount.

4. The rear axle arrangement as claimed in claim 1, wherein the link having the at least one elastic bearing is a link rod and the transmitted force is introduced as a radial force into the bearing.

5. The rear axle arrangement as claimed in claim 1, wherein the elastic bearing has a non-linear bearing stiffness, the elastic bearing having a higher bearing stiffness at relatively high-frequency excitation, in particular above 2 Hz, and having a correspondingly lower bearing stiffness at low-frequency excitation and, in particular, being elastically deformable.

6. The rear axle arrangement as claimed in claim 1, wherein the link with the elastic bearing is arranged in front of the other links of the same wheel suspension system in the driving direction, the link running such that it is oriented in the motor vehicle transverse direction.

7. The rear axle arrangement as claimed in claim 1, wherein the change into toe-out is set on the basis of the kinematic coupling of the link to the elastic bearing.

8. The rear axle arrangement as claimed in claim 1, wherein the kinematic coupling of the link to the elastic bearing is configured in such a way that, in the case of low-frequency dynamic wheel loading, the wheel presses in the direction of toe-out and the change into toe-out sets a negative camber.

* * * * *